United States Patent [19]

Reese et al.

[11] Patent Number: 5,353,692
[45] Date of Patent: Oct. 11, 1994

[54] HOT BEVERAGE BREWING APPARATUS

[75] Inventors: Robert J. Reese, St. Charles; Gerald J. Podgorny, St. Louis; Franklin D. Newkirk, Florissant; Mark S. Schmitz, St. Charles; George R. Fink, St. Louis, all of Mo.

[73] Assignee: Unidynamics Corporation, Stamford, Conn.

[21] Appl. No.: 129,249

[22] Filed: Sep. 29, 1993

[51] Int. Cl.$^5$ .............................................. A47J 31/00
[52] U.S. Cl. ..................... 99/289 T; 99/304
[58] Field of Search ............... 99/279, 289 R, 289 T, 99/300, 304, 295, 280, 323; 426/433

[56] References Cited

U.S. PATENT DOCUMENTS

| | | | |
|---|---|---|---|
| 3,446,137 | 5/1969 | Pryor et al. | 99/289 |
| 3,683,790 | 8/1972 | Black | 99/289 |
| 4,134,332 | 1/1979 | Merman | 99/289 T |
| 4,432,707 | 2/1984 | Anderson et al. | 417/477 |
| 4,484,515 | 11/1984 | Illy | 99/289 T |
| 4,651,632 | 3/1987 | Motsch | 99/289 R |
| 4,694,739 | 9/1987 | Daintrey et al. | 99/289 R |
| 4,791,859 | 12/1988 | King | 99/289 R |
| 4,793,244 | 12/1988 | King | 99/285 |
| 4,825,758 | 5/1989 | Snowball et al. | 99/282 |
| 4,967,647 | 11/1990 | King | 99/280 |
| 5,127,317 | 7/1992 | Takayanagi | 99/289 T |

FOREIGN PATENT DOCUMENTS 2155907 10/1985 United Kingdom .
2178645 2/1987 United Kingdom .

OTHER PUBLICATIONS

Tom Andel, "Peristaltic Pump Preserves Pounds", Appliance Manufacturer, Jan. 1990, p. 70.
Anko Products, Inc. Brochure, Sep. 1992, Series 9X8.

*Primary Examiner*—Robert W. Jenkins
*Attorney, Agent, or Firm*—Senniger, Powers, Leavitt & Roedel

[57] ABSTRACT

A hot beverage brewing and dispensing machine having a brewing cylinder for receiving a hot liquid and a beverage product for brewing, a base member beneath the brewing cylinder with a brewed liquid outlet through which beverage brewed in the brewing chamber can flow, a seal between the base member and a bottom end of the brewing cylinder with a filter material therebetween for sealing the cylinder during brewing when the brewing cylinder is brought into engagement with the filter material, a filter feed mechanism, a tube for supplying liquid and a chute for supplying beverage product to an upper portion of the brewing cylinder, and a conical dispersing surface disposed at the upper portion of the brewing cylinder upon which the liquid and beverage product impinge from their supply means and which disperses the liquid and beverage product as they fall to a bottom portion of the brewing cylinder washing the cylinder walls. A peristaltic pump is connected to the outlet in the base member for extracting the brewed liquid from the brewing cylinder and dispensing it at a cup station. A movable cup stand is provided to allow a carafe to be positioned in the cup station for filling.

17 Claims, 8 Drawing Sheets

HOT BEVERAGE BREWING APPARATUS

BACKGROUND OF THE INVENTION

The present invention relates to hot beverage brewing apparatus and, more particularly, to the type used as merchandisers for brewing and selling predetermined amounts of hot beverages of various types.

There are many types of hot beverage brewing apparatus that use a variety of constructions and techniques for brewing and dispensing. Some, for example, utilize pressurized brewing chambers to shorten the brewing time. Others utilize brewing chambers that are open to atmosphere, but which are designed to agitate and mix the brewing liquid and product in some manner to shorten the brewing time. In either form of device the object is to use the least amount of beverage product, such as tea or coffee grounds, to obtain the maximum flavor for the volume of water used, in the shortest possible time. Although the pressurized brewer is effective in shortening the brewing time, prior art constructions are fairly complex in construction and thus are difficult to disassemble and clean. Likewise, prior art constructions of open brewing chambers generally utilize pistons to form the bottom of the brewing chamber which is difficult to maintain without leakage and is difficult to clean. Since almost all such hot drink merchandisers are intended to be left at an unattended location for substantial periods of time, such as several days, it is essential that they can be easily and quickly cleaned.

The prior art constructions of piston-type brewing chambers referred to above are particularly prone to wear because of the sliding contact between the piston and sealing rings and the brewing cylinder wall. This wear results in a frequent need of disassembly and replacement of the worn parts which is time consuming, relatively complex and expensive. Many such devices rely on the upward movement of the piston at the beginning of the brewing cycle to create agitation of the liquid and beverage product from which the flavor is to be extracted. This technique does not uniformly mix the product and liquid and is thus relatively inefficient and results in the need for use of more beverage product than would otherwise be necessary.

In some designs of hot beverage merchandisers it is a desirable feature to be able to fill a carafe as well as a single cup. This presents a problem, however, since the carafe is usually much taller than a single cup because it holds multiple cups of beverage. Thus, in some prior art machines it has been known to use a folding cup station which can be swung out of the way so that a carafe may be positioned on a lower stationary shelf for filling. The difficulty with such folding cup stations of the prior art is that they are difficult to manipulate and tend to rest against the carafe and push it off of the stationary shelf. Still other cup stations in prior art devices are simply removable and, thus, tend to be lost.

SUMMARY OF THE INVENTION

The present invention overcomes the above described difficulties and disadvantages associated with prior art hot beverage merchandisers by providing one which is efficient in mixing the liquid and beverage product, relatively simple of construction, is easily disassembled, has very few wearing parts and is easy to clean.

The hot beverage brewing and dispensing machine of the present invention provides an open-to-atmosphere brewing chamber designed to introduce the liquid and beverage product at the top of the chamber and mix them uniformly as they fall together to the bottom of the chamber where they steep for the required time. The brewing chamber is mounted to a carrier housing which permits the chamber to be raised and lowered from a base which supports a renewable filter material that is replaced during each cycle when the chamber is separated from the base. A peristaltic pump then draws the brewed liquid from the chamber through a filter and deposits it at a cup station. A movable platform is suspended from within the cabinet housing the brewing mechanism so as to be counterbalanced and require very little pressure to be applied to move it out of the way to place a carafe at the cup station to be filled.

The advantages of the present invention over the prior art are further provided by a hot beverage brewing and dispensing machine having a brewing cylinder providing a brewing chamber therein for receiving a hot liquid and a beverage product for brewing; a base member disposed beneath the brewing cylinder and having a brewed liquid outlet therein through which beverage brewed in the brewing chamber can flow; means for sealing between the base member and a bottom end of the brewing cylinder with a filter material therebetween for sealing the cylinder during brewing when the brewing cylinder is brought into engagement with the filter material; means for feeding filter material between the bottom edge of the brewing cylinder and the base member when the brewing cylinder is disengaged from the base member; means for supplying liquid and beverage product to an upper portion of the brewing cylinder; and a dispersing surface disposed at the upper portion of the brewing cylinder upon which the liquid and beverage product impinge from their supply means and which disperses the liquid and beverage product as they fall to a bottom portion of the brewing chamber. The beverage brewing and dispensing machine of the present invention also includes means for simultaneously dispensing liquid and beverage product from their supply means so that they mix as they fall to the bottom portion of the brewing cylinder.

Furthermore, the dispersing surface is preferably formed to disperse the liquid and beverage product substantially uniformly around an upper portion of the brewing chamber and is substantially conical and the liquid and beverage product supply means provide the liquid and beverage product substantially at the vertex of the conical dispersing surface.

The brewing and dispensing machine of the present invention also preferably includes a brewing cylinder carrier supporting the brewing cylinder for movement therewith; a stationary brewing cylinder housing supporting the brewing cylinder carrier and brewing cylinder for vertical reciprocal movement; and means releasably interlocking the brewing cylinder with the carrier so as to permit removal of the cylinder from the carrier.

The beverage brewing and dispensing machine of the present invention also preferably includes a cabinet in which the brewing cylinder housing is mounted; and the brewing cylinder housing being pivotally mounted at an upper end portion thereof in receiving grooves formed in the cabinet which permit the housing to be lifted from the groves for removal from the cabinet. The base member is removably mounted to the brewing cylinder housing by means mounted to the base member for releasably engaging the housing and for positively locating the base member in proper relation to the housing for positioning the beverage outlet therein beneath the brewing cylinder.

The beverage brewing and dispensing machine of the present invention also preferably further includes a cup station remote from the outlet in the base member; a peristaltic pump, connected between the outlet in the base member and the cup station, for removing brewed beverage from the brewing chamber through the outlet and delivering it to the cup station.

The beverage brewing and dispensing machine of the present invention also preferably further includes a cabinet encompassing the brewing cylinder; a cup station in the cabinet for receiving a cup or carafe and disposed remote from the brewing cylinder and having a brewed beverage outlet, the cabinet having a vertical wall at a rear portion of the cup station; means for pumping brewed beverage from the outlet in the base member to the outlet at the cup station; a customer accessible stationary platform positioned beneath the cup station outlet; a displaceable platform disposed above the stationary platform; and means supporting the displaceable platform and mounted to the cabinet for swinging movement between a first position wherein the displaceable platform is beneath the cup station beverage outlet and customer accessible in front of the wall at the rear portion of the cup station, and a second position wherein it is pivoted out of the cup station and substantially behind the wall at the rear of the cup station. The means for supporting the displaceable platform preferably includes a bracket hingedly connected to the cabinet door above the cup station and which extends behind the vertical wall at the rear portion of the cup station.

DETAILED DESCRIPTION OF THE PREFERRED EMBODIMENT

Figure 1:
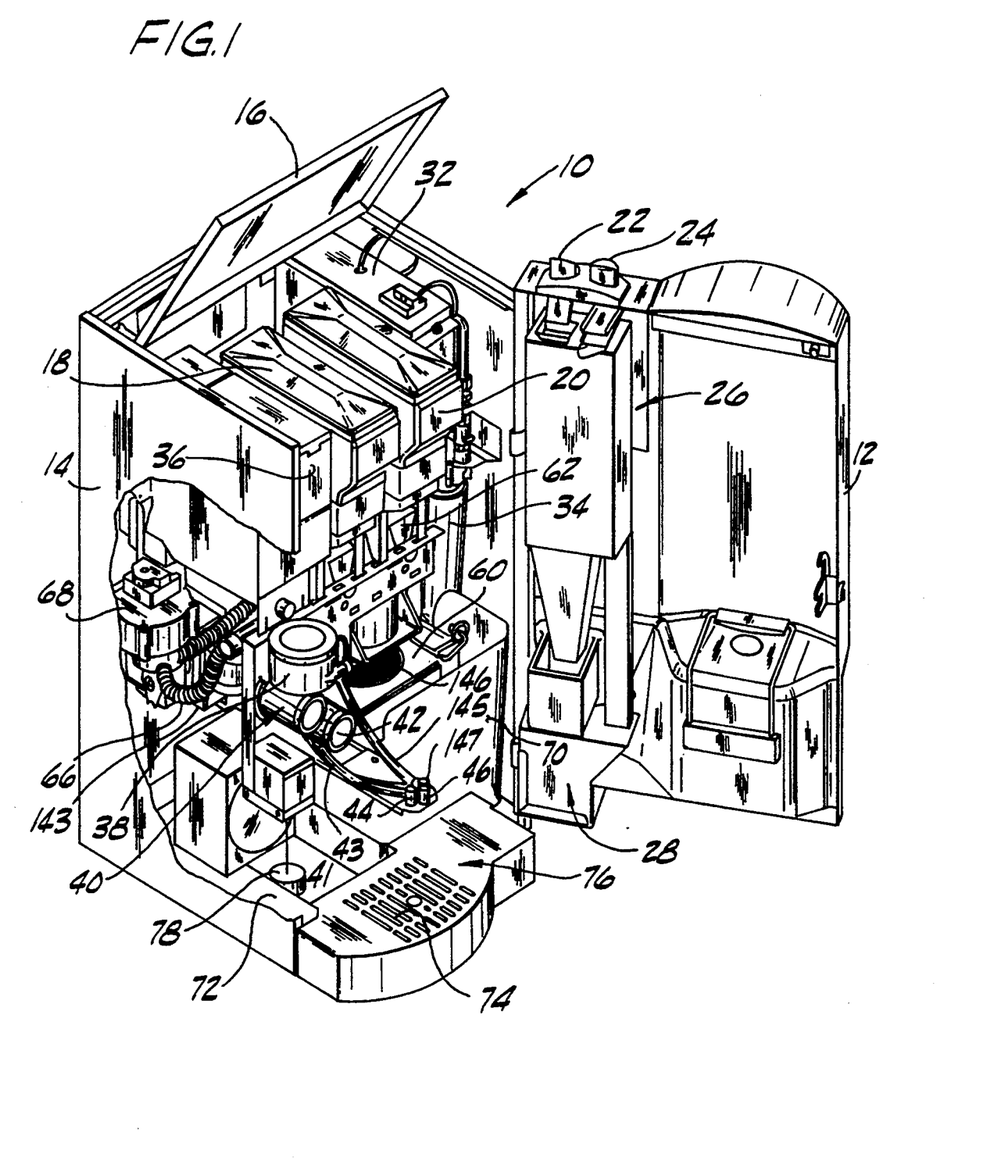
FIG. 1 is a pictorial view of the preferred embodiment of the present invention with the service door in the open position showing the interior of the machine.
Figure 2:
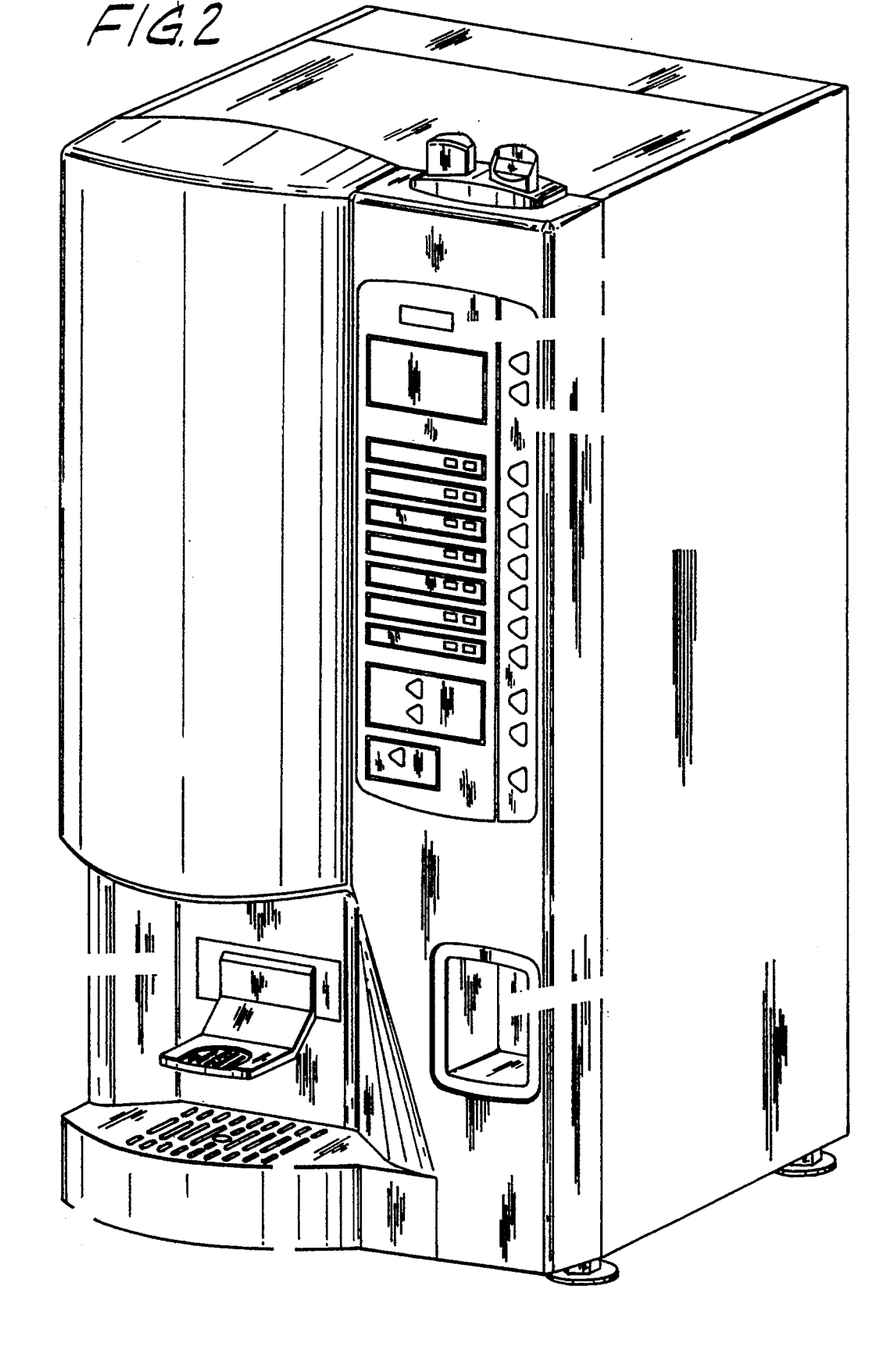
FIG. 2 is a pictorial view of the embodiment of FIG. 1 with the service door closed.

The hot beverage brewing and dispensing machine 10 of the present invention is shown in FIG. 1 in its preferred form as a table top vending machine with its front service door 12 open, revealing the components within its cabinet 14. A hinged lid 16 is also provided in the top of the cabinet 14 to allow easy access to components described below and for ease of filling product canisters 18 and 20 with product such as coffee, decaffeinated coffee or tea. Also for ease of access, the money handling equipment is mounted in the service door 12. The coin slot 22 and coin return button 24 are mounted on the top of machine 10 for easy access by a customer. A coin sorting mechanism 26 can be any one of a number of known commercial mechanisms for this purpose and the details thereof will not be discussed further herein. A coin storage box 28 is secured to the service door 12 beneath the coin mechanism 26 and a coin return cup 30, shown in FIG. 2, is formed in the front of service door 12 for returning change or bad coins to the customer.

Referring again to FIG. 1, a hot water heating and storage tank 32 is mounted to the side of cabinet 14 for providing the hot liquid, in this case water, to the brewing system. A water filter 34 is provided on the inlet to the hot water tank 32. A chocolate ingredient canister 36 is shown mounted in cabinet 14 next to product canister 18. A mixing bowl 38 and whipping mechanism 40 are mounted beneath canister 36 for receiving chocolate and water and mixing and whipping the same in a well known manner. A second whipping mechanism 42 is provided to whip cappuccino or espresso. The outlets of the whipping mechanisms 40 and 42 are connected by flexible hoses 41 and 43 to dispensing nozzles 44 and 46, respectively, which are mounted in the top of a cup station 50, as shown in FIGS. 1 and 2, where a cup or carafe can be positioned and which is described in more detail below. A brewer, shown generally as 60 in FIG. 1, is mounted to the cabinet 14 beneath the canisters 18 and 20 and a chute 62, disposed between the outlets of the canisters and the brewer, directs the product from the canisters 18 and 20 to the top of the brewer 60.

A moisture evacuation system is provided which removes steam coming from the brewer 60 and mixing bowl 38 when hot water is dispensed into them. As shown in FIG. 1, the system consists of a tube 64 which extends behind the mixing bowl 38 and above the brewer 60. The tube 64 has openings above the brewer 60 and the mixing bowl 38 for sucking steam in which rises from these mechanisms and is connected by a flexible hose 66 to a suction fan 68 mounted to the back of cabinet 14 and which is vented to the outside of the cabinet. Positioned in the cabinet 14 beneath brewer 60 is a removable used grounds bucket 70 into which is deposited used coffee grounds from the brewer 60. A removable spilled liquid drain tray 72 is positioned in the bottom of cabinet 14 and contains liquid, such as spilled coffee, which has been spilled into the drain grate 74 that forms part of the stationary carafe support 76 in the bottom of the cup station 50. A machine cutoff switch/float 78 is used in conjunction with the drain tray 72 to shut the machine 10 down if the tray becomes full.

Figure 3:
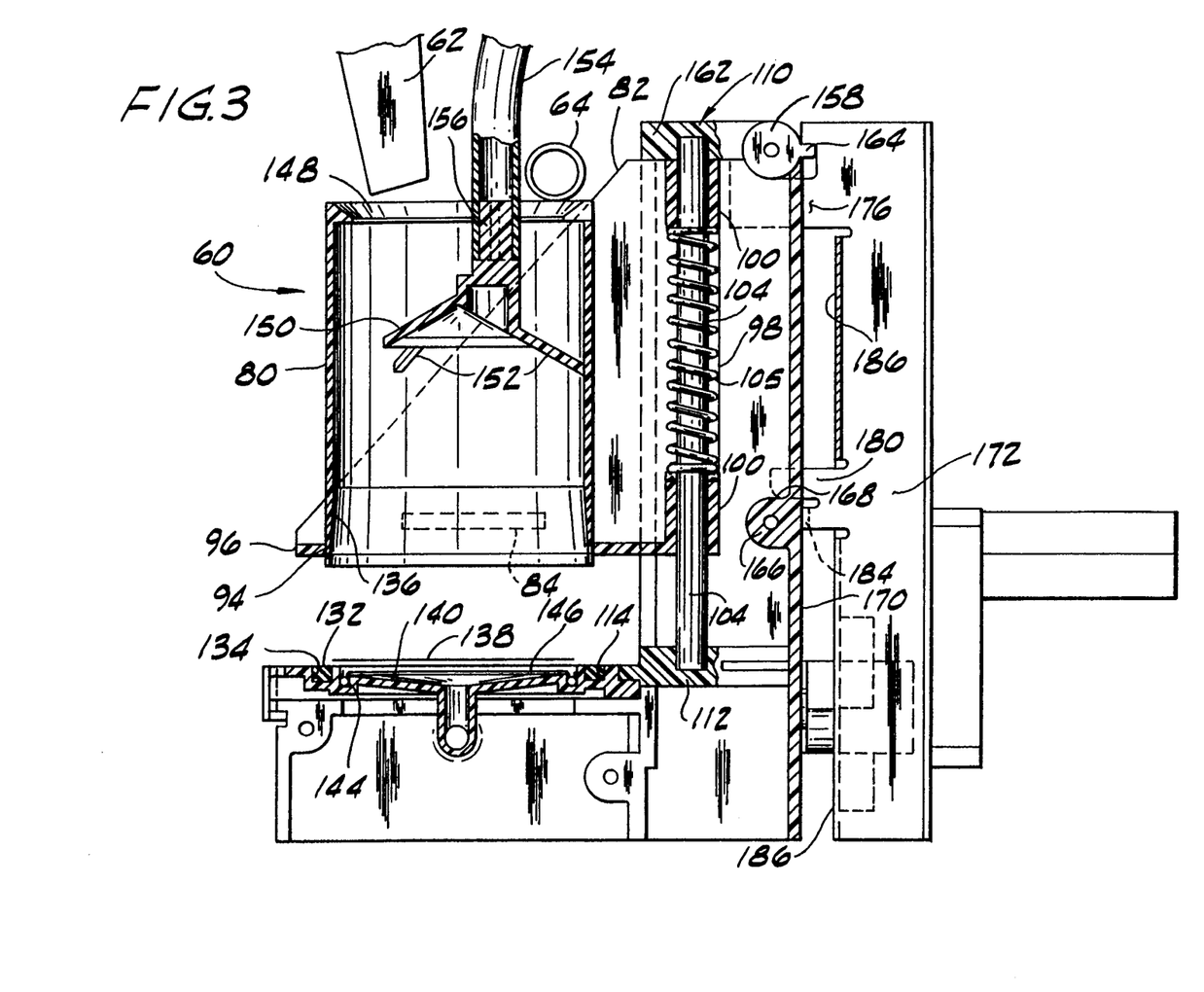
FIG. 3 is a sectional view of the brewing mechanism taken along line 3—3 of FIG. 5.
Figure 4:
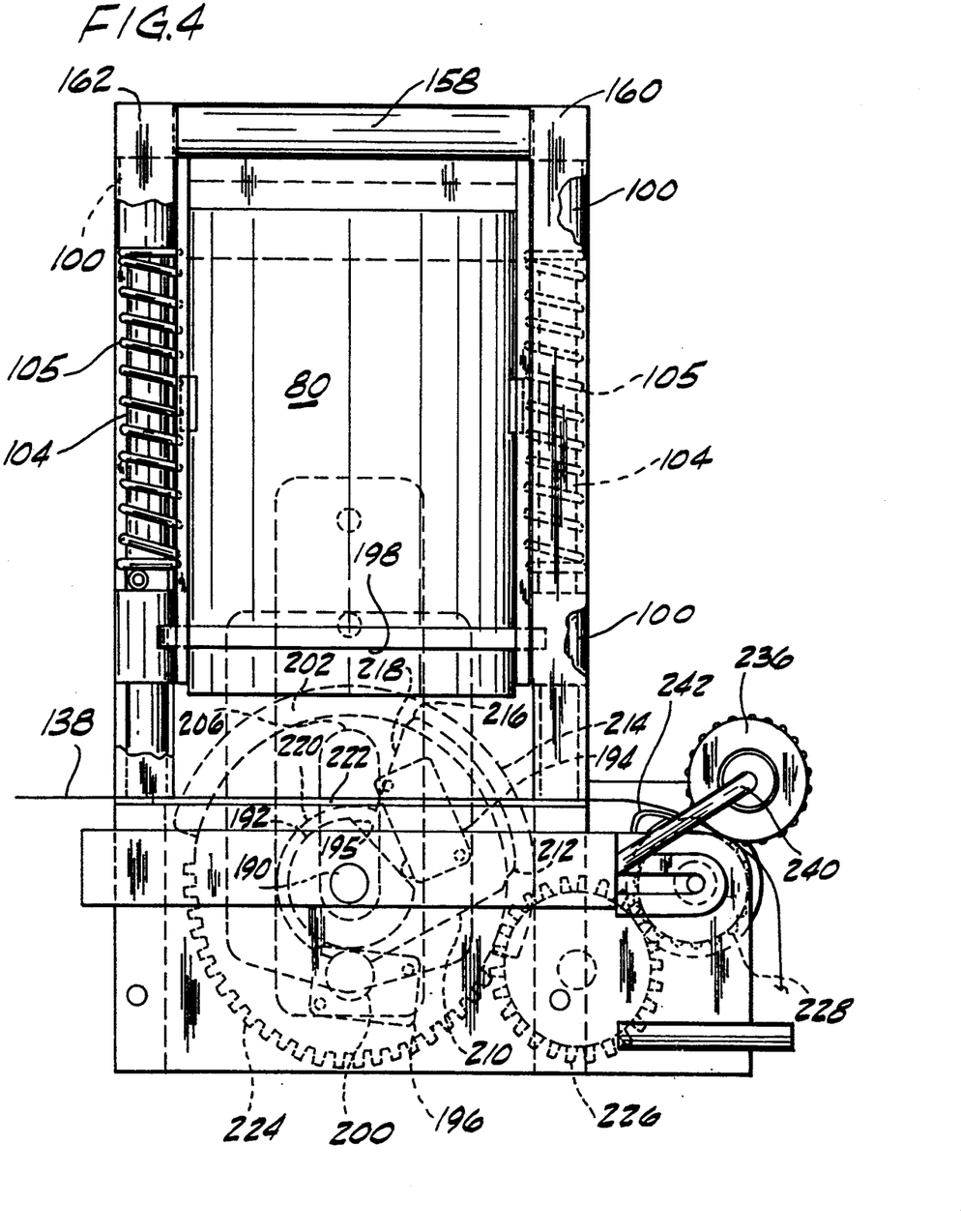
FIG. 4 is a front view of the brewing mechanism.
Figure 5:
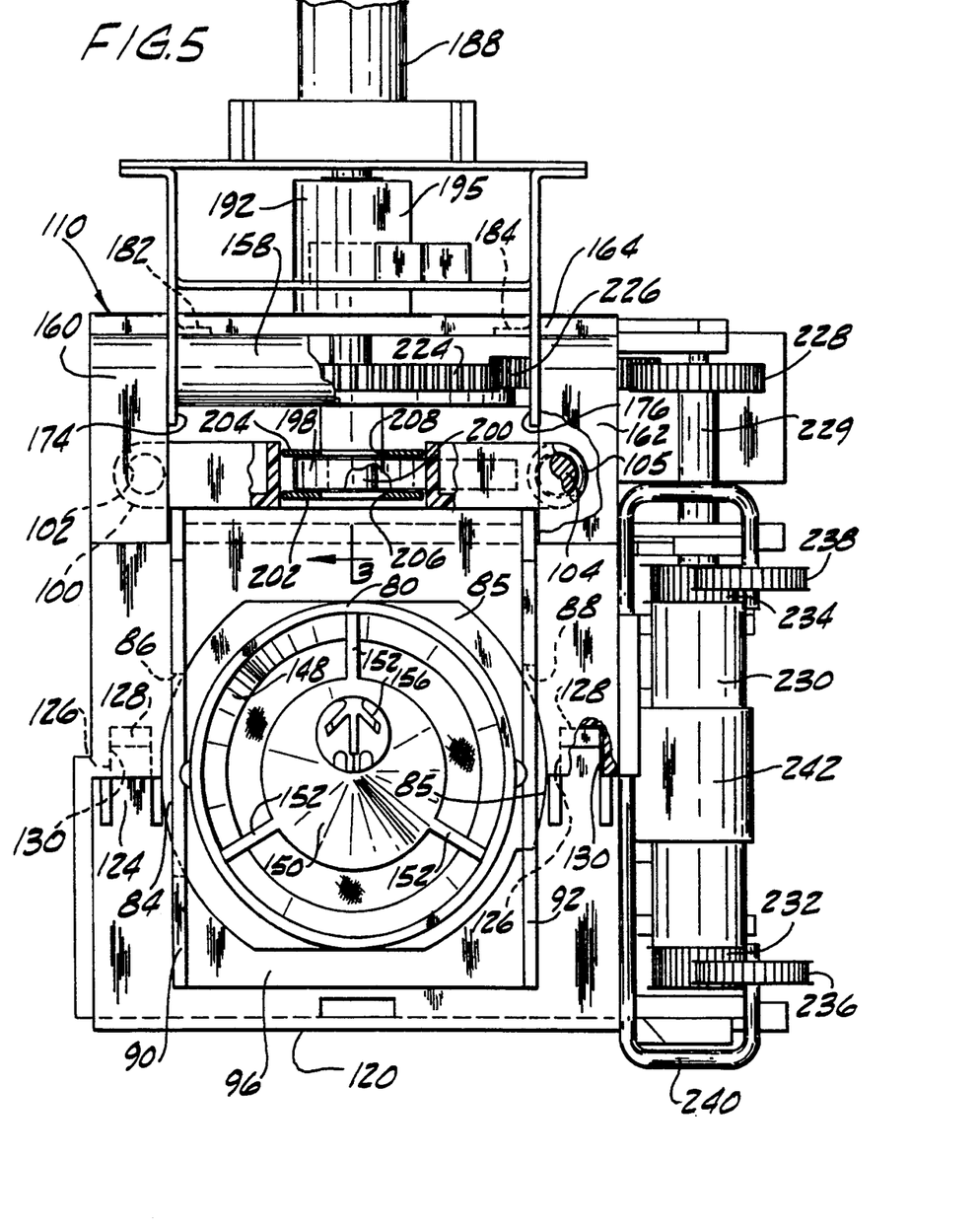
FIG. 5 is a top plan view of the brewing mechanism.

Referring now more particularly to the brewer 60 and its associated mechanisms, as best seen in FIGS. 3–5, a brewing cylinder 80, preferably formed of a rigid molded plastic material, provides an internal cylindrical brewing chamber throughout a substantial portion of its length. Brewing cylinder 80 is removably mounted to a brewing cylinder carrier 82, also preferably made of rigid plastic, by means of a pair of diametrically opposed tabs 84 and 85 formed integral to the outside bottom surface of the brewing cylinder and received with frictional engagement in a pair of slots 86 and 88 formed in respective vertical side walls 90 and 92 on opposite sides of carrier 82. A large diameter hole 94 is defined in a horizontal base plate 96 formed in carrier 82 that mates with and receives the outside surface of brewing cylinder 80. Side walls 90 and 92 and base plate 96 are integrally formed with back plate 98 which is provided with four ears 100 at the top and bottom and each of which is provided with a cylindrical guide hole 102 with the pairs of tabs 100 on each side of the back plate 98 having their guide holes 102 aligned for receiving a respective guide rod 104 therein for sliding movement thereon.

The pair of guide rods 104 are secured at there ends to a stationary brewing cylinder housing 110 which supports the brewing cylinder 80 and carrier 82 for sliding vertical movement therein. A pair of springs 105 are concentriclly mounted with respective guide rods 104 and are captive between upper tabs 100 and a pair of roll pins 107 placed in receiving holes formed in guide rods 104. As brewing cylinder carrier 82 moves downwardly it compresses springs 105 between tabs 100 and roll pins 107 to create an upward bias to urge the carrier rapidly upward at the end of the brewing cycle sufficiently to jar loose most of the residual beverage product used in the previous brewing cycle when it is stopped as described below. Housing 110 is also preferably formed of rigid plastic and has a generally rectangular horizontal base plate 112 formed at the bottom thereof with a semi-cylindrical opening 114 formed at a forward edge thereof, as best seen in FIG. 4. A separate base member 120 is provided with a semi-cylindrical extension 122 which mates with semi-cylindrical opening 114. Base member 120 is also preferably formed of plastic and has a pair of extensions 124 which are received in guide ways 126 formed in base plate 112 of housing 110. Extensions 124 are provided with locking tabs 128 which are resiliently received in slots 130 formed in base plate 112 so that they lock base member 120 into engagement with stationary brewing cylinder housing 110, but can be depressed by a service person to remove the base member 120 from housing 110 for cleaning.

Base member 120 contains a seal 132 which is rectangular in cross-section and circular in shape and fits into a receiving groove 134 formed in base member 120. The lower end portion 136 of brewing cylinder 80 is tapered, as shown in FIG. 3, and sealingly engages seal 132 through filter material 138 when the brewing cylinder 80 and brewing cylinder carrier 82 are lowered toward the brewing cylinder housing 110. In the central region of the base member 120 is a conical cavity 140 that directs brewed beverage to an outlet 142 formed beneath the cavity in base member 120. Mounted in a second circular groove 144 formed in base member 120 is a filter material support screen 146 which is circular and extends across cavity 140. Screen 146 is of a relatively large mesh and fairly rigid so as not to inhibit flow of brewed material through the filter material 138 while supporting it with the charge of beverage product on the filter material during brewing.

Connected to the outlet 142 in base member 120 is a peristaltic pump, shown generally at 143 in FIG. 1, which has its outlet connected by tube 145 to nozzle 147 at cup station 50. Peristaltic pump 143 can be of any type sufficient to provide the pumping capacity, however, it has been found that a series 820 pump made by Anko Products, Inc. of Bradenton, Fla. and driven by a model HGM-80385X motor made by Molon Motors and Coil Corp. of Rolling Meadows, Ill., has worked satisfactorily. Such pumps are disclosed generally in U.S. Pat. No. 4,432,707.

Referring again to the construction of the brewing cylinder 80, it is provided at its upper end with a splash guard 148 in the form of a lip having an upper conical surface and a horizontal lower surface which reduce the amount of water and beverage product that are splashed out of the cylinder 80 when they are being introduced into it. A dispersion cone 150 is mounted in the central region of cylinder 80 by three support ribs 152 preferably formed integral with cone 150 and cylinder 80. Hot water from the hot water tank 32 is introduced to cylinder 80 via hot water line 154 which is fitted to a veined connector 156 formed at approximately the vertex of cone 150. Veins 156, as best seen in FIG. 5, direct the hot water substantially uniformly around the upper surface of cone 150. Likewise, product delivery chute 62 directs the beverage product, such as coffee, from either canister 18 or 20 to the area of the vertex of cone 150 so that it mixes with the hot water which is simultaneously delivered by hot water line 154 and impinges on the upper surface of cone 150 and is thus distributed around the upper portion of cylinder 80 and is mixed as it falls into the lower portion of cylinder 80 where it is allowed to steep for an appropriate length of time. Since cone 150 directs the mixture of water and beverage product against the walls of cylinder 80, it tends to wash the walls thus reducing the residue which might otherwise accumulate. As mentioned above, a moisture suction tube 64, as shown in FIG. 3, is mounted in cabinet 14 above the top of cylinder 80 to remove any steam that might rise from the cylinder 80 during brewing.

Referring again to the stationary brewing cylinder housing 110, as best seen in FIGS. 3 and 5, a horizontal cylindrical support member 158 is formed at the rear of upper portions of side walls 160 and 162 of housing 110. A horizontal stop tab 164 is formed along the length of the back side of member 158. A further generally cylindrical support member 166 is formed at approximately the middle of the housing 110 and has a horizontal flat surface 168 formed where it joins the back wall 170 of housing 110. A brewer assembly support bracket 172, formed of sheet metal, is mounted stationary in cabinet 14. Bracket 172 is generally U-shaped in cross-section and has a pair of brewer assembly support tabs 174 and 176 formed at the upper end and a second pair of support tabs 178 and 180 formed in the middle portion. Tabs 178 and 180 have ears 182 and 184 formed thereon which extend in a common vertical plane in front of the front surface 186 of bracket 172. Cylindrical support member 158 sets in grooves formed in tabs 174 and 176 so that the brewer assembly can be pivoted about the axis of member 158. The outer edges of the rear surface of brewing cylinder carrier 82 rest against the ears 182 and 184 and the stop tab 164 rests against a surface in tabs 174 and 176 to position the brewing cylinder 80 substantially vertically. Thus, the brewing cylinder assembly, consisting mainly of the brewing cylinder 80, base plate 96, brewing cylinder carrier 82 and brewing cylinder housing 110, can be easily pivoted outwardly at the bottom and then removed from the support tabs 174 and 176 for disassembly and cleaning.

Mounted within U-shaped bracket 172 is a brewer drive motor 188 with a drive shaft 190 extending through the bracket with a first camming member 192 secured thereto for rotation therewith. Camming member 192 is cylindrical with a single flat surface 195 which engages micro-switches 194 and 196 as it rotates. Micro-switches 194 and 196 are mounted to bracket 172 and are used as control signals during the brewing cycle as discussed below. Also mounted to drive shaft 190 for rotation therewith is a second camming member 198 which engages a cam follower wheel 200 mounted for rotation to a pair of extension plates 202 and 204 which sandwich wheel 200 between them and which have their opposite ends secured to the lower portion of the rear wall of brewing cylinder carrier 82, as best seen in FIG. 5. A pair of slots 206 and 208 are formed in extension plates 202 and 204, respectively, to allow for clearance of the drive shaft 190 as camming member 192 rotates clockwise as viewed in FIG. 4 to cause cam follower wheel 200 to move up and down vertically and thus cause extension plates 202 and 204 as well as carrier 82 to move vertically.

Camming member 198 is shown in FIG. 4 in its rest position which is were it begins a brewing cycle. As the brewing cycle begins, camming member 198 is rotated clockwise and follower wheel 200 rides along a first camming surface 210 which causes the carrier 82 and thus the brewing chamber 80 to move downwardly towards base plate 96. When wheel 200 first leaves its rest position the sensor arm of micro-switch 194 leaves the flat surface 195 of camming member 192 which causes the micro-switch 194 to send a signal to the control microprocessor to initiate a delay, sufficient to allow the brewing chamber to close, before the water and beverage product are introduced into the brewing chamber. As follower wheel 200 rounds corner 212 the lower edge of cylinder 80 engages the seal 132 with the filter paper 138 between them to seal the brewing chamber for brewing. Camming member 198 continues to rotate until it is at about the halfway point in second camming surface 214 at which point micro-switch 196 is activated by flat surface 195 in camming member 192 to stop the drive motor 188 for the needed brewing time. After sufficient time to complete brewing, the motor 188 is started again and follower wheel 200 continues its relative movement along camming surface 214. When follower wheel 200 reaches corner 216 it begins a steep and rapid assent along camming surface 218 because of the pressure of the compressed springs 105. When follower wheel 200 reaches camming surface 220 the upward movement of the brewing cylinder 80 comes to an abrupt halt, causing any remaining beverage product from the previous brewing cycle to be bounced off of the internal side walls of brewing cylinder 80, as previously mentioned. The motor continues to rotate camming member 198 until follower wheel 200 enters semicircular indentation 222, at which point the switch arm of micro-switch 194 senses flat surface 195 in camming member 192 which stops motor 188 to end the brewing cycle.

Figure 6:
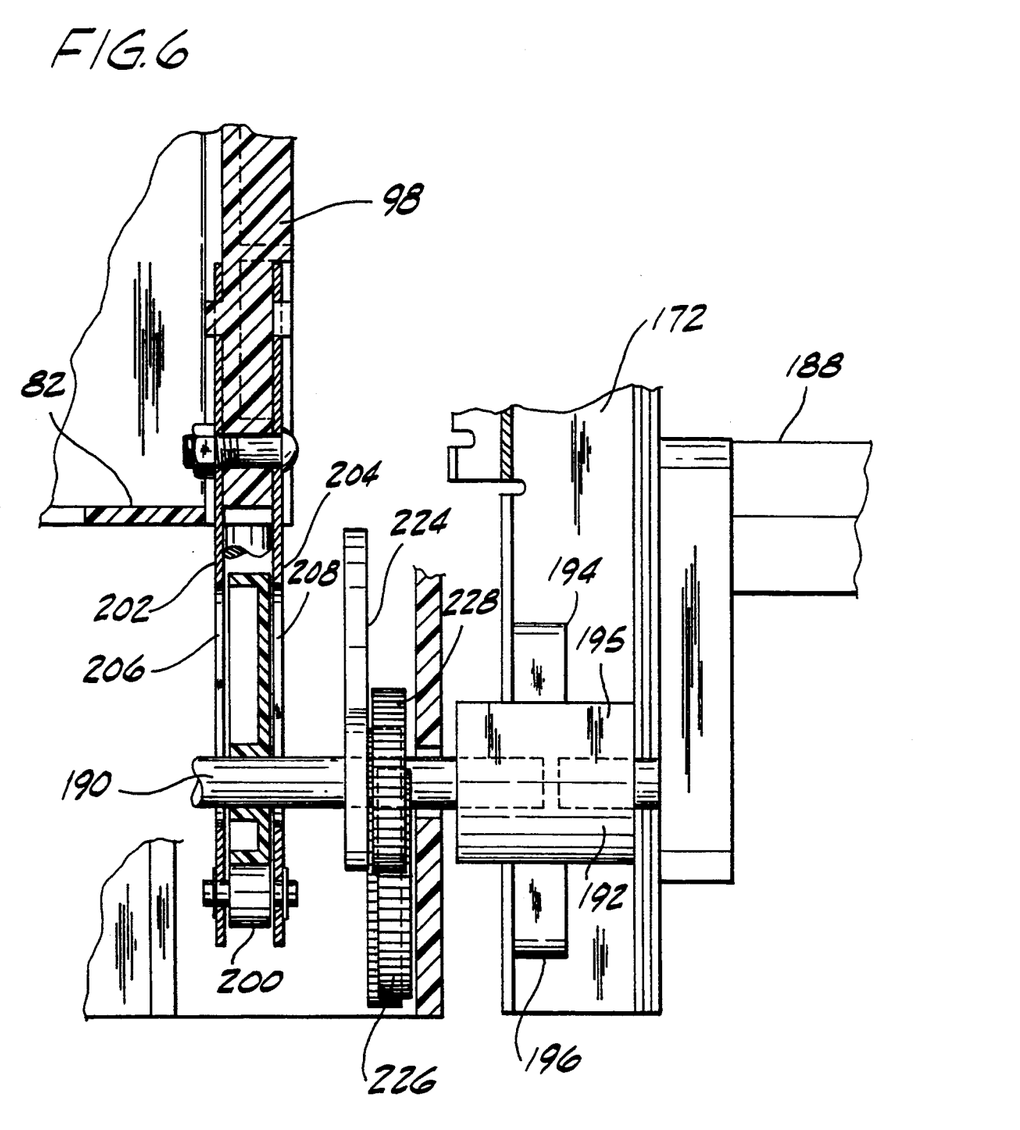
FIG. 6 is an enlarged partial cross-sectional view from the side of the brewing mechanism showing the drive mechanism.

Referring now to the mechanism for driving the filter paper 138, as best seen in FIGS. 4–6, it is fed between the bottom edge of brewing cylinder 80 and seal 132 fitted into the base member 120 between brewing cycles. This is accomplished by a gear train which includes a sector gear 224 mounted to the drive shaft 190 for rotation therewith, a gear 226 in engagement with the sector gear and a gear 228 in engagement with gear 226 and which is, in turn mounted to a shaft 229 for rotating the paper drive cylinder 230. Cylinder 230 is provided with a pair of friction drive surfaces 232 and 234 at the ends thereof and which are ribbed to engage the filter paper 138 for a more positive feed. A pair of ribbed follower wheels 236 and 238 engage wheels 232 and 234, respectively, and are urged into engagement therewith by a spring biased bar 240 on which they are mounted for rotation. A paper glide member 242 of thin sheet metal or the like is fastened to the base member 120 and extends over the center of, but does not touch, cylinder 230 to help keep the filter paper 138 on its proper track.

As seen in FIG. 4, the sector gear 224 is provided with teeth on only approximately half of its circumference. Since it rotates clockwise, as viewed in FIG. 4, the teeth do not engage gear 226 until it has rotated approximately half way around from the position shown. This rotation correlates to the end of the brewing and the opening of the brewing chamber 20. Thus, the teeth of sector gear 224 do not engage gear 226 to move the filter paper 138 until the cylinder 80 has disengaged from the filter paper and seal 132. Sector gear then engages gear 226 for the remainder of its rotation and thus advances the filter paper sufficiently to place clean paper under the brewing cylinder 80 for the next cycle. When the drive shaft 190 has stopped, the end of the teeth of sector gear 224 just disengage the teeth of gear 226 and are positioned for the beginning of the next brewing cycle.

Figure 7:
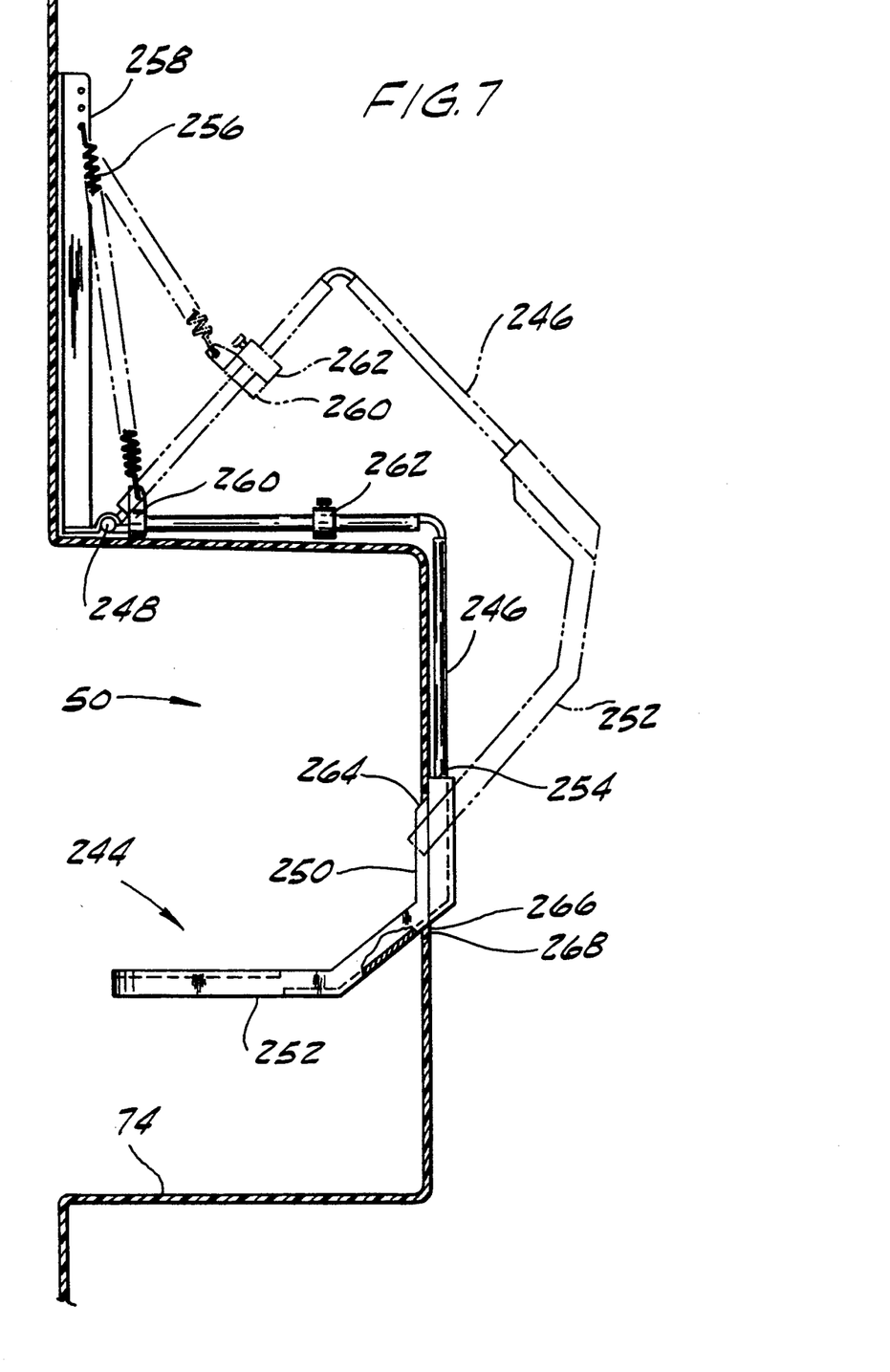
FIG. 7 is an enlarged partial side cross-sectional view through the cup station.
Figure 8:
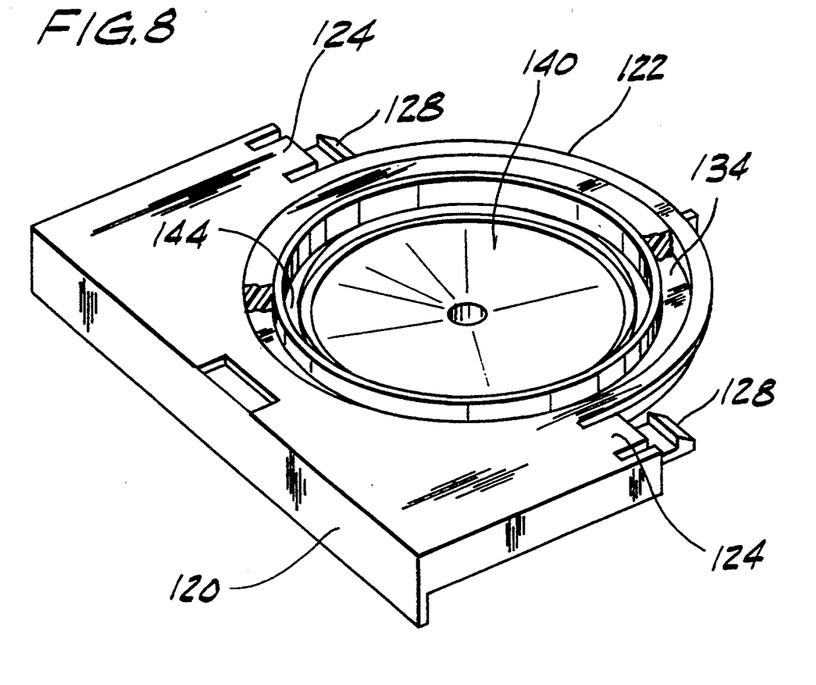
FIG. 8 is a pictorial view of the base member.

Referring now to the movable cup stand, shown generally as 244, which is positioned in the cup station 50, as shown in FIGS. 1, 2 and 7, it consists of a wire-form 246 of generally U-shape construction which is pivoted at its upper end 248 to the inside upper surface of the cup station 50 formed in the lower front of door 12, a cover plate 250 attached to the wire-form 246 and a cup platform 252 secured to the lower end 254 of wire-form 246. A counter-balance spring 256 is also provided which has its upper end fastened to a bracket 258 mounted to the inside of door 12 above the cup station 50, and has its lower end fastened to a slide member 260 which slides along one side of wire-form 246. An adjustable stop 262 is provided on wire-form 246 to limit the rearward movement of slide member 260. The counter-balance spring 256 is designed to compensate for most of the weight of the cup stand 244 so that when it is pushed out of the way of the cup station 50, to the hidden line position shown in FIG. 7, by insertion of a carafe into the cup station 50, it does not tend to push the carafe off of stationary platform 76 on which it is placed for filling.

Cup platform 252 is provided with an open grid surface, as shown in FIG. 2, which allows any spillage to pass through it and be caught in drain 72 beneath grate 74. Cover plate 250 has tapered edges 264 and 266 which allow it to swing into and out of the corresponding opening 268 formed in the back of the cup station 50 and to essentially close the opening when in the position shown in FIG. 7.

Referring again to FIG. 2, a selection programming keypad 270 is provided for allowing the customer to select a beverage and condiments in a well known manner. The key pad also allows the customer to select whether he is filling a carafe or a cup which determines the amount of beverage to be brewed. The keypad 270 is connected to a microprocessor (not shown) which establishes the brewing times and operation of the output of the canisters 18 and 20 in a well known manner and will therefore not be discussed in further detail herein. A vacuum-fluorescent message display 272 is also provided for supplying information about the selection and credit in the coin mechanism for observation by the customer, also controlled by the microprocessor.

In operation, the customer deposits coins through the coin slot 22 into the coin mechanism and makes a selection from the keypad 270. The drive motor 188 is then activated causing brewing cylinder 80 to move downwardly and engage seal 132 in base member 120 with the filter paper 138 disposed therebetween. The appropriate amount of beverage material is then deposited by the appropriate canister 18 or 20 into the chute 62 and is thus deposited on the conical dispersing surface 150. Simultaneously with the deposit of the beverage product on the surface 150, hot water is supplied through line 154 to the dispersing surface 150 and mixes with the beverage product and is dispersed about the upper portion of the brewing chamber as it falls to the lower portion. The motor 188 is then stopped, as mentioned above, for the appropriate steeping time and then it is restarted. After the liquid and product have steeped, the peristaltic pump 143 is activated to draw the brewed liquid from the brewing cylinder 80 and deposit it at the cup station 50. After the brewed liquid is withdrawn from the brewing chamber, the follower wheel 200 moves to the steep camming surface 218 causing brewing cylinder 80 and carrier 82 to be propelled upwardly by springs 105 until it is stopped by the impact of wheel 200 on cylindrical surface 222 of camming member 198. This impact causes any residue of beverage product clinging to the sides of the brewing chamber to be freed and deposited on the filter paper 138. The filter paper is then advanced by sector gear 224 and the motor 188 is then stopped in its rest position, completing the brewing cycle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A beverage brewing and dispensing machine, comprising:

a brewing cylinder providing a brewing chamber therein for receiving a hot liquid and a beverage product for brewing;

a base member disposed beneath the brewing cylinder and having a brewed liquid outlet therein through which beverage brewed in the brewing chamber can flow;

means for sealing between the base member and a bottom end of the brewing cylinder with a filter material therebetween for sealing the cylinder during brewing when the brewing cylinder is brought into engagement with the filter material;

means for feeding filter material between the bottom edge of the brewing cylinder and the base member when the brewing cylinder is disengaged from the base member;

means for supplying liquid and beverage product to an upper portion of the brewing cylinder; and a dispersing surface disposed at the upper portion of the brewing cylinder upon which the liquid and beverage product impinge from their supply means and which disperses the liquid and beverage product as they fall to a bottom portion of the brewing chamber.

2. A beverage brewing and dispensing machine as defined in claim 1, including means for simultaneously dispensing liquid and beverage product from their supply means so that they mix as they fall to the bottom portion of the brewing cylinder.

3. A beverage brewing and dispensing machine as defined in claim 2 wherein the dispersing surface is formed to disperse the liquid and beverage product substantially uniformly around an upper portion of the brewing chamber.

4. A beverage brewing and dispensing machine as defined in claim 3 wherein the dispersing surface is substantially conical and the liquid supply means provides the liquid substantially at the vertex of the conical dispersing surface.

5. A beverage brewing and dispensing machine as defined in claim 4 wherein the beverage product supply means provides beverage product substantially at the vertex of the conical dispersing surface.

6. A beverage brewing and dispensing machine as defined in claim 1, including:

a brewing cylinder carrier supporting the brewing cylinder for movement therewith;

a stationary brewing cylinder housing supporting the brewing cylinder carrier and brewing cylinder for vertical reciprocal movement; and means releasably interlocking the brewing cylinder with the carrier so as to permit removal of the cylinder from the carrier.

7. A beverage brewing and dispensing machine as defined in claim 6, including:

a cabinet in which the brewing cylinder housing is mounted; and the brewing cylinder housing being pivotally mounted at an upper end portion thereof in receiving groves formed in the cabinet which permit the housing to be lifted from the groves for removal from the cabinet.

8. A beverage brewing and dispensing machine as defined in claim 6, including:

the base member being removably mounted to the brewing cylinder housing by means mounted to the base member for releasably engaging the housing and for positively locating the base member in proper relation to the housing for positioning the beverage outlet therein beneath the brewing cylinder.

9. A beverage brewing and dispensing machine as defined in claim 1, including:

a cup station remote from the outlet in the base member;

a peristaltic pump connected between the outlet in the base member and the cup station for removing brewed beverage from the brewing chamber through the outlet and delivering it to the cup station.

10. A beverage brewing and dispensing machine as defined in claim 1, including:

a filter material support member mounted to the base member inside the cylindrical seal above the liquid outlet; and filter material feed means for feeding filter material between the brewing cylinder and the base member when the brewing cylinder is disengaged from the filter material and for depositing the expended beverage product at a remote location.

11. A beverage brewing and dispensing machine as defined in claim 1, including:

a cabinet encompassing the brewing cylinder;

a cup station in the cabinet for receiving a cup or carafe and disposed remote from the brewing cylinder and having a brewed beverage outlet, the cabinet having a vertical wall at a rear portion of the cup station;

means for pumping brewed beverage from the outlet in the base member to the outlet at the cup station;

a customer accessible stationary platform-positioned beneath the cup station outlet;

a displaceable platform disposed above the stationary platform; and means supporting the displaceable platform and mounted to the cabinet for swinging movement between a first position wherein the displaceable platform is beneath the cup station beverage outlet and customer accessible in front of the wall at the rear portion of the cup station, and a second position wherein it is pivoted out of the cup station and substantially behind the wall at the rear of the cup station.

12. A beverage brewing and dispensing machine as defined in claim 11 wherein the means for supporting the displaceable platform includes:

a bracket hingedly connected to the cabinet door above the cup station and which extends behind the vertical wall at the rear portion of the cup station.

13. A beverage brewing and dispensing machine, comprising:

a brewing cylinder providing a brewing chamber therein for receiving a hot liquid and a beverage product for brewing;

a base member disposed beneath the brewing cylinder and having a brewed liquid outlet therein through which beverage brewed in the brewing chamber can flow;

means for sealing between the base member and a bottom end of the brewing cylinder with a filter material therebetween for sealing the cylinder during brewing when the brewing cylinder is brought into engagement with the filter material;

means for feeding filter material between the bottom edge of the brewing cylinder and the base member when the brewing cylinder is disengaged from the base member;

means for supplying liquid and beverage product to an upper portion of the brewing cylinder; and a peristaltic pump connected to the brewed liquid outlet for withdrawing brewed liquid from the brewing chamber through the filter material and supplying it to a receptacle.

14. A beverage brewing and dispensing machine, comprising:

a brewing cylinder providing a brewing chamber therein for receiving a hot liquid and a beverage product for brewing;

a base member disposed beneath the brewing cylinder and having a brewed liquid outlet therein through which beverage brewed in the brewing chamber can flow;

means for sealing between the base member and a bottom end of the brewing cylinder with a filter material therebetween for sealing the cylinder during brewing when the brewing cylinder is brought into engagement with the filter material;

means for feeding filter material between the bottom edge of the brewing cylinder and the base member when the brewing cylinder is disengaged from the base member;

means for supplying liquid and beverage product to an upper portion of the brewing cylinder;

a brewing cylinder carrier supporting the brewing cylinder for movement therewith;

a stationary brewing cylinder housing supporting the brewing cylinder carrier and brewing cylinder for vertical reciprocal movement; and means releasably interlocking the brewing cylinder with the carrier so as to permit removal of the cylinder from the carrier.

15. A beverage brewing and dispensing machine as defined in claim 14, including:

a cabinet in which the brewing cylinder housing is mounted; and the brewing cylinder housing being pivotally mounted at an upper end portion thereof in receiving grooves formed in the cabinet which permit the housing to be lifted from the grooves for removal from the cabinet.

16. A beverage brewing and dispensing machine as defined in claim 14, including:

the base member being removably mounted to the brewing cylinder housing by means mounted to the base member for releasably engaging the housing and for positively locating the base member in proper relation to the housing for positioning the beverage outlet therein beneath the brewing cylinder.

17. A beverage brewing and dispensing machine, comprising:

a brewing cylinder providing a brewing chamber therein for receiving a hot liquid and a beverage product for brewing;

a base member disposed beneath the brewing cylinder and having a brewed liquid outlet therein through which beverage brewed in the brewing chamber can flow;

means for sealing between the base member and a bottom end of the brewing cylinder with a filter material therebetween for sealing the cylinder during brewing when the brewing cylinder is brought into engagement with the filter material;

means for feeding filter material between the bottom edge of the brewing cylinder and the base member when the brewing cylinder is disengaged from the base member;

means for supplying liquid and beverage product to an upper portion of the brewing cylinder;

a cabinet encompassing the brewing cylinder;

a cup station in the cabinet for receiving a cup or carafe and disposed remote from the brewing cylinder and having a brewed beverage outlet, the cabinet having a vertical wall at a rear portion of the cup station;

means for pumping brewed beverage from the outlet in the base member to the outlet at the cup station;

a customer accessible stationary platform positioned beneath the cup station outlet;

a displaceable platform disposed above the stationary platform; and means supporting the displaceable platform and mounted to the cabinet for swinging movement between a first position wherein the displaceable platform is beneath the cup station beverage outlet and customer accessible in front of the wall at the rear portion of the cup station, and a second position wherein it is pivoted out of the cup station and substantially behind the wall at the rear of the cup station.

* * * * *